United States Patent Office 3,168,534
Patented Feb. 2, 1965

3,168,534
HYDROXYLATION PRODUCTS OF DIHYDRO-
PYRAN DERIVATIVES AND THEIR HYDRO-
GENATION TO TETRAHYDROXY ALKANES
George B. Payne, Berkeley, Calif., assignor to Shell Oil
Company, New York, N.Y., a corporation of Delaware
No Drawing. Filed Dec. 28, 1961, Ser. No. 162,923
15 Claims. (Cl. 260—345.7)

This invention relates to new cyclic ethers having a special structure which makes them valuable starting materials for the manufacture of polymeric products. The advantageous polymers and other new derivatives of the novel polyhydroxy cyclic ethers are also features of the invention.

The new cyclic ethers of the invention are polyhydroxy tetrahydropyrans which have each of the carbon atoms linked to the ether oxygen atom substituted by a functional group. One of these functional groups is the hydroxyl group and the other is a methylol group (—CH$_2$OH) or a carbonyl group, particularly a formyl carboxyl

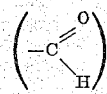

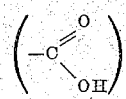

or ester group

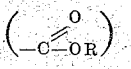

The ring carbon atom linked to the hydroxyl-substituted carbon atoms directly joined tot he ether oxygen is also substituted by a hydroxyl group. Thus the new ethers have two adjacent carbinol groups linked to the ether oxygen which is directly attached to the ring carbon which carries the methylol or carbonyl substituent. In the following more detailed description of the invention the methylol, carboxaldehyde and carboxyl-substituted polyhydroxy tetrahyropyrans will be discussed separately since each of these three types of new compounds has its own special advantages and properties although all three types share common structural features which make them similarly reactive under certain conditions so that both types can serve for the synthesis of certain similarly useful derivatives.

Especially advantageous new polymer-forming compounds of the invention are 2,3-dihyroxy-6-carbonyl-substituted tetrahydropyrans which can be represented by the formula:

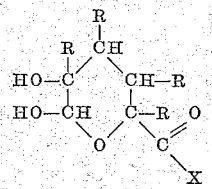

In this formula the R's can be the same of different members of the group consisting of hydrogen atoms and lower alkyl radicals. Especially advantageous compounds are those of this formula in which R is hydrogen or an alkyl radical of 1 to 3 carbon atoms, that is a methyl, ethyl or normal or isopropyl radical. X in this formula represents hydrogen or a hydroxyl or hydrocarbyloxy radical. Representative new formyl-substituted dihydroxytetrahydropyrans of this type, that is, compounds of the foregoing formula in which X represents hydrogen are: 2,3-dihydroxtetrahydropyran-6-carboxaldehyde and its alkyl substitution products such as 2,3-dihydroxy-5-methyltetrahydropyran-6-
carboxaldehyde;
2,3-dihydroxy-5,6-dimethyltetrahydropyran-6-
carboxaldehyde;
2,3-dihydroxy-5-ethyl-4-isopropyltetrahydropyran-6-
carboxaldehyde;
2,3-dihydroxy-4,6-diethyl-3-normal propyltetrahyrodro-
pyran-6-carboxaldehyde;
2,3-dihydroxy-3,4,5,6-tetramethyltetrahydropyran-6-
carboxaldehyde and the like.

Examples of new carboxylic acid-substituted dihydroxy tetrahydropyrans of the invention, that is compounds of the preceding formula in which X represents the carboxylic acid group (—COOH) are 2,3-dihydroxytetrahydropyran-6-carboxylic acid;
2,3-dihydroxy-4-methyltetrahydropyran-6-carboxylic acid;
2,3-hydroxy-4,6-diethyltetrahydropyran-6-carboxylic
acid;
2,3-dihydroxy-4-methyl-3-normal propyltetrahydropyran-
6-carboxylic acid;
2,3-dihydroxy4,5,6-triisopropyltetrahydropyran-6-
carboxylic acid;
2,3-dihydroxy-5,6-dimethyl-3,4-diethyltetrahydropyran-
6-carboxylic acid and similar alkyl-substituted
2,3-dihydroxytetrahydropyran-6-carboxylic acids.

The esters of these acids are included in this subgroup of the new compounds. The esters of the aliphatic saturated and monooelefinic alcohols of 1 to 18 carbon atoms are particularly advantageous.

The new methylol-substituted compounds of the invention which are represented by the foregoing structural formula when X represents the —CH$_2$OH group, are exemplified by 2,3-dihydroxytetradropyran-6-methanol;
2,3-dihydroxy-5-methyltetrahydropyran-6-methanol;
2,3-dihydroxy-4,5-dimethyltetrahydropyran-6-methanol;
2,3-dihydroxy-3-ethyl-5-methyltetrahydropyran-6-
methanol;
2,3,-dihydroxy-4-ethyl-3-isopropyltetrahydropyran-6-
methanol;
2,3-dihydroxy-3,4,5-triethyltetrahydropyran-6-methanol;
2,3-dihydroxy-6-methyl-4,5-diethyl-3-normal
propyltetrahydropyran-6-methanol and the like.

The new compounds can be made conveniently by hydroxylating the corresponding 3,4-dihydro-1,2-pyrans substituted in the 2 position by a carboxaldehyde, carboxylic acid or carboxylic acid ester or methanol group. U.S. Patents 2,479,283 and 2,479,284 describe suitable methods of making dihydropyrans of this type which are advantageous starting materials for hydroxylation to the new compounds of the invention. The foregoing formyl-substituted dihydroxytetrahydropyrans can be produced by hydroxlating 3,4-dihydro-1,2-pyran-2-carboxaldehyde;
3-methyl-3,4-dihydro-1,2-pyran-2-carboxaldehyde;
2,3-dimethyl-3,4-dihydro-1,2,-pyran-2-carboxaldehyde;
3-ethyl-4-isopropyl-3,4-dihydro-1,2-pyran-2-carboxalde-
hyde
2,4-diethyl-5-normal propyl-3,4-dihydro-1,2,-pyran-
2-carboxaldehyde and
2,3,4,5-tetramethyl-3,4-dihydro-1,2-pyran-2-
carboxaldehyde, respectively.

Similarly, the carboxylic acid-substituted compounds given as examples above, can be synthesized by hydroxylating
3,4-dihydro-1,2-pyran-2-carboxylic acid;
4-methyl-3,4-dihydro-1,2-pyran-2-carboxylic acid;

2,4-diethyl-3,4-dihydro-1,2-pyran-2-carboxylic acid;
4-methyl-5-normal propyl-3,4-dihydro-1,2-pyran-2-carboxylic acid;
2,3,4-triisopropyl-3,4-dihydro-1,2-pyran-2-carboxylic acid and
2,3-dimethyl-4,5-diethyl-3,4-dihydro-1,2-pyran-2-carboxylic acid respectively while the new ester products are made by hydroxylating the corresponding esters of these acids.

Hydroxylation of the following methylol-substituted dihydropyrans affords the respective methylol-substituted dihydroxytetrahydropyrans given above as examples of this subgroup of the new compounds of the invention:

3,4-dihydro-1,2-pyran-2-methanol;
3-methyl-3,4-dihydro-1,2-pyran-2-methanol;
3,4-dimethyl-3,4-dihydro-1,2-pyran-2-methanol;
3-methyl-5-ethyl-3,4-dihydro-1,2-pyran-2-methanol;
4-ethyl-5-isopropyl-3,4-dihydro-1,2-pyran-2-methanol;
3,4,5-triethyl-3,4-dihydro-1,2-pyran-2-methanol and
2-methyl-3,4-diethyl-5-normal propyl-3,4-dihydro-1,2-pyran-2-methanol.

The hydroxylation can be carried out advantageously by reacting the dihydropyran compound with hydrogen peroxide using tungstic acid as the catalyst. Amounts of tungstic acid between about 0.1 and about 10% w. of the dihydropyran compound being hydroxylated are suitable, amounts between about 1 and about 5% w. being more advantageous. The reaction is most suitably effected at a pH of about 4 to about 6 which can be maintained by adding a base to the reaction mixture at an appropriate rate. Sodium or potassium or other alkali metal hydroxide or lime or other alkaline earth metal hydroxide or inorganic carbonates such as sodium bicarbonate and the like or other buffering agents can be used for control of the pH. Approximately equal molecular amounts of hydrogen peroxide and dihydropyran compound are useful proportions but an excess of either reactant can be employed and it is generally preferable to use a small excess of hydrogen peroxide. Aqueous hydrogen peroxide of about 10 to about 90% concentration can be used but concentrations in the range of about 20 to about 60% by the order of about 10° to about 60° C. can be used, but the best results are usually obtained at about 25° to about 50° C. In this temperature range the hydroxylation is usually sufficiently complete in about 1 to about 5 hours. Any suitable method of contacting the reactants in the liquid phase can be employed in carrying out the reaction which can be conducted batchwise, continuously or intermittently. Inert solvents for the reactants can be used as an aid in promoting intermittent contact of the reactants especially where solid starting dihydropyran compounds are used. However, with liquid reactants a solvent is usually not necessary. Any suitable method of product recovery can be used. Solvent extraction combined with distillation is often useful but it is not essential that these new products be recovered as such since they are often useful for further reaction without separation from the mixture in which they are produced.

The following examples illustrate in more detail some of the ways in which the new compounds can be produced by hydroxylating the corresponding dihydropyran compound.

*Example I.—Production of 2,3-dihydroxytetrahydropyran-6-carboxaldehyde*

To a 1-liter, 3-neck, round-bottom flask equipped with stirrer, thermometer, dropping funnel and condenser were charged 300 ml. of water, 2.0 g. of tungstic acid, 7.9 ml. of 1.037 N sodium hydroxide and 0.55 mole of 30% hydrogen peroxide. This mixture was stirred at 40° C. as 56 grams (0.50) of freshly distilled 3,4-dihydro-1,2-pyran-2-carboxaldehyde was added over a period of half an hour. The pH was held at 4.5 to 5.0 by adding 24 ml. of normal sodium hydroxide over a three hour period. At that time the reaction was indicated to be 98% complete by iodometric titration. Analysis shows production of 2,3-dihydroxytetrahydropyran-2-carboxaldehyde in substantially quantative yield.

*Example II.—2,3-dihydroxy-6-methyltetrahydropyran-6-carboxaldehyde production*

When the process of Example I is carried out using 63 grams of 2-methyl-3,4-dihydro-1,2-pyran-2-carboxaldehyde for the reaction, a similar good yield of 2,3-dihydroxy-6-methyltetrahydropyran-6-carboxaldehyde is obtained.

*Example III.—2,3-dihydroxy-3,6-dimethyltetrahydropyran-6-carboxaldehyde production*

2,5-dimethyl-3,4-dihydro-1,2-pyran-2-carboxaldehyde reacted with about 10% excess of 30% hydrogen peroxide solution in the apparatus of Example I for about three hours while maintaining the pH about 4.5 by periodic addition of 1 N sodium hydroxide solution affords a good yield of 2,3-dihydroxy-3,6-dimethyltetrahydropyran-6-carboxaldehyde.

*Example IV.—2,3-dihydroxytetrahydropyran-6-carboxylic acid production*

Reacting as in Example I but using one half mole of 3,4-dihydro-1,2-pyran-2-carboxylic acid in place of the 3,4-dihydro-1,2-pyran-2-carboxaldehyde affords a good yield of 2,3-dihydroxytetrahydropyran-2-carboxylic acid in the form of sodium salt from which it can be recovered or converted to its esters. Reaction with ethyl chloride, for instance, affords the ethyl ester in good yield while ethylene bis(2,3-dihydroxytetrahydro-pyran-6-carboxylate) is obtained when reacting with ethylene dichloride.

*Example V.—2,3-dihydroxy-6-methyltetrahydropyran-6-carboxylic acid production*

Using 0.55 mole of 30% hydrogen peroxide for reaction with 71 grams (0.50 mole) of 2-methyl-3,4-dihydro-1,2-pyran-2-carboxylic acid by the method of Example I and maintaining the pH about 5.0 by addition of normal sodium hydroxide solution affords 2,3-dihydroxy-6-methyltetrahydropyran-6-carboxylic acid sodium salt in good yield.

*Example VI.—2,3-dihydroxy-3,6-dimethyltetrahydropyran-6-carboxylic acid production*

When half a mole of 2,5-dimethyl-3,4-dihydro-1,2-pyran-2-carboxylic acid is substituted for the 3,4-dihydro-1,2-pyran-2-carboxaldehyde in the method of Example I the product is 2,3-dihydroxy-3,6-dimethyltetrahydropyran-6-carboxylic acid sodium salt.

*Example VII.—2,3-dihydroxytetrahydropyran-6-methanol production*

Half a mole (57 g.) of 3,4-dihydro-1,2-pyran-2-methanol was reacted at 25–30° C. by the method of Example I using N sodium hydroxide to maintain the pH above 4.5. After 4 hrs., iodometric titration showed that 0.49 mole of peroxide had been consumed. Only 9 ml. of alkali had been consumed. Product was 2,3-dihydroxytetrahydropyran-2-methanol in good yield.

*Example VIII.—2,3-dihydroxy-6-methyltetrahydropyran-6-methanol production*

The method of Example VII using an equal molecular amount of 2-methyl-3,4-dihydro-1,2-pyran-2-methanol in place of the 3,4-dihydro-1,2-pyran-2-methanol affords a good yield of 2,3-dihydroxy-6-methyltetrahydropyran-6-methanol.

*Example IX.—2,3-dihydroxy-3,6-dimethyltetrahydropyran-6-methanol production*

2,5-dimethyl-3,4-dihydro-1,2-pyran-2methanol reacted by the process of Example I with about 10% excess of 30% hydrogen peroxide at about 35° C. for three hours while maintaining a pH of about 5.0 by adding sodium hydroxide solution (1 N) as required, affords 2,3-dihydroxy-3,6-dimethyltetrahydropyran-6-methanol in good yield.

Using the method of the foregoing examples 5-methyl-3,4-dihydro-1,2-pyran-2-carboxaldehyde can be similarly hydroxylated to obtain 2,3-dihydroxy-3-methyl-tetrahydropyran-6-carboxaldehyde; 3,4 - dimethyl - 3,4-dihydro-1,2-pyran-2-carboxaldehyde can be hydroxylated to 2,3-dihydroxy-4,5-dimethyltetrahydropyran - 6-carboxaldehyde and 2,3,5-trimethyl-3,4-dihydro-1,2-pyran-2-carboxaldehyde can be converted to 2,3-dihydroxy-3,5,6-trimethyltetrahydropyran-6-carboxaldehyde. In the same way 2,3-dihydroxy-3-ethyltetrahydropyran-6-carboxylic acid is produced from 5-ethyl-3,4-dihydro-1,2-pyran-2-carboxylic acid; 2,3-dihydroxy-3,5-dimethyltetrahydropyran-6 - carboxylic acid is produced from 3,5-dimethyl-3,4-dihydro-1,2-pyran-2-carboxylic acid and 2,3-dihydroxy-3,4-dimethyl-5-ethyltetrahydropyran-6-carboxylic acid is obtained by hydroxylating 4,5-dimethyl-3-ethyl-3,4-dihydro-1,2-pyran-2-carboxylic acid.

The ethyl ester of 3,4-dihydro-1,2-pyran-2-carboxylic acid affords the ethyl ester of 2,3-dihydroxytetrahydropyran-6-carboxylic acid under the conditions of Example I while the methyl ester of 2,4-dimethyl-3,4-dihydro-1,2-pyran-2-carboxylic acid yields the methyl ester of 2,3-dihydroxy-4,6-dimethyltetrahydropyran - 6 - carboxylic acid and the isopropl ester of 2,3,4-trimethyl-3,4-dihydro-1,2-pyran-2-carboxylic acid yields the isopropyl ester of 2,3-dihydroxy-4,5,6-trimethyltetrahydropyran - 6 - carboxylic acid under like conditions.

From 4,5-dimethyl-3,4-dihydro-1,2-pyran-2-methanol a good yield of 2,3-dihydroxy-3,4-dimethyltetrahydropyran-6-methanol is obtained and from 2,4,5-trimethyl-3,4-dihydro-1,2-pyran-2-methanol and 3,4,5-trimethyl-3,4-dihydro-1,2-pyran-2-methanol one obtains 2,3-dihydroxy-3,4,6-trimethyltetrahydropyran-6-methanol and 2,3-dihydroxy-3,4,5-trimethyltetrahydropyran-6-methanol, respectively, under similar conditions.

Other methods of manufacturing the new compounds are available. The 2,3-dihydroxytetrahydropyran-6-carboxylic acids can be made by oxidizing the corresponding new aldehydes which can also be reduced by hydrogenation or reaction with lithium hydride or an aluminum alcoholate or the like to make the new 2,3-dihydroxytetrahydropyran-6-methanols.

As previously pointed out these new compounds are advantageous starting materials for the manufacture of polymeric materials having valuable properties. Both homopolymers and copolymers can be produced. Thermal polymerization of the new 2,3-dihydroxy-tetrahydropyran-2-carboxaldehydes, for example, yields polymeric cyclic hemi-acetals according to the equation:

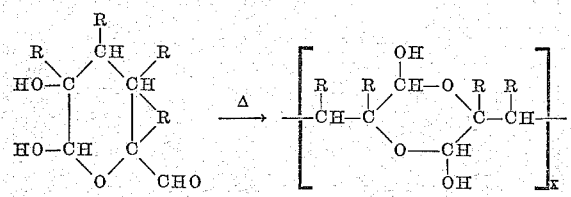

In this equation R represents hydrogen or a lower alkyl group as previously described and $x$ is a number representing the degree of polymerization which will depend upon the polymerization conditions used but will usually be at least about 6 and more advantageously about 20 or higher. Heating at about 50° C. to about 100° C. for about 10 minutes to an hour or more is usually sufficient but higher temperatures and longer times can be used to promote higher degrees of polymerization. The polymerization can be carried out in bulk or in solution in suitable solvents such as water or aqueous or anhydrous acetone, chloroform or the like. Depending upon the degree of polymerization achieved, the products are liquids or high molecular weight solids which will have various degrees of solubility in conventional solvents such as benzene, toluene, acetone, and the like. The higher molecular weight polymers can be utilized in many important applications with or without cross linking of the polymer chains through the free hydroxyl groups. Suitable cross linking agents are, for instance, polycarboxylic acids such as maleic acid, terephthalic acid and the like, or polyisocyanates such as toluene diisocyanates, durene diisocyanate, etc. Satisfactory cures can usually be obtained with about 0.1 to about ten mole percent of cross linking agent based on the amount of 2,3-dihydroxytetrahydropyran-2-carboxaldehyde initially employed. The cross linking agent is advantageously added after at least partial polymerization of the starting 2,3-dihydroxytetrahydropyran-2-carboxaldehyde. The products can be pressed or molded into various plastic articles and, depending on their solubility, can be used in surface coating and impregnating compositions which can be applied in molten form or in solution.

The 2,3-dihydroxytetrahydropyran-6-carboxylic acids can be polymerized by heating, preferably in the presence of an acid-acting catalyst, to form polymers with ester and hemi-acetal linkages in accordance with the equation:

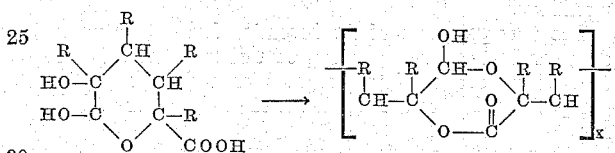

where the R's and X have the same significance as in the previous equation. The polymerization is most advantageously carried out at about 80° to about 100° C. with simultaneous removals of the water formed in the esterification. This can be accomplished by distillation, for instance with an azeotroping agent such as toluene or the like. Suitable catalysts are sulfuric, phosphoric and like acids which are effective in very small amounts of the order of about 0.02 to 0.5% w. for example. These polymers can be applied in molding or surface coating with or without cross linking through the hydroxyl group of the hemiacetal linkage as described above in connection with the new dihydroxytetrahydropyran-6-carboxaldehydes.

Where esters of the 2,3-dihydroxytetrahydropyran-6-carboxylic acids are used as starting materials for the polymers, the products prepared in the same way will be linear poly-hemiacetals having the ester groups as side chains as shown in the following equation:

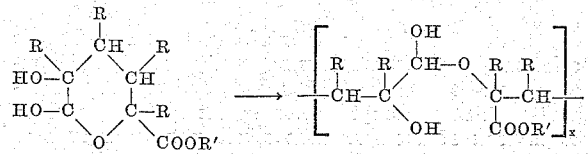

Here R and $x$ have the significance previously indicated and R' represents the radicl 1 of the alcohol which was used in making the starting ester. Particularly advantageous starting esters for this application are those from unsaturated alcohols such as allyl, methallyl and the hypothetical vinyl alcohol since the resulting polymers can be cross linked by peroxide-catalyzed polymerization of the unsaturated alcohol groups. With esters of unsaturated alcohols such as, for instance, the alkyl esters of 1 to 4 carbon atoms, the cross linking can be effected by reaction of the free hydroxyl groups with polycarboxylic carboxylic acids or polyisocyanates as previously described. All these are applicable for molding and surface coating in the same way as those made from the corresponding 2,3-dihydroxytetrahydropyran-6-carboxylic acids.

The polymerization of the new 2,3-dihydroxytetrahydropyran-6-methanols can be carried out as above described for the corresponding ester compounds. The linear hemiacetal products will have methylol groups in place of the ester groups on the chain and these can take part in cross linking in the same way as the other free hydroxyl groups affording polymers of analogous properties.

The polymers of the present invention can be utilized for a variety of different applications. They can be pressed into attractive plastic moldings or formed into sheets, films or funicular structures such as bristles, filaments and other articles commonly made with synthetic resins. They can be used by themselves in these applications or they can be combined with various plasticizing materials, such as esters, as dioctyl phthalate, tricresyl phosphate, 1,5-pentanediol dipropionate, hexanetriol triacetate, polyethylene glycols, polypropylene glycols, glycerol, hexanetriol, glycerol tributyl ether and the like, and mixtures thereof.

The new polymers can also be blended or otherwise combined with other polymers and resins or tars and pitches. They can be combined, for example, with epoxy resins, polyurethane resins, polyamide, urea-formaldehyde and phenol resins, polythiopolymercaptans, vinyl resins, coal tar, asphalt, middle oil, coal tar pitch, and the like, in various proportions. Such blending can be used to improve stability, workability or extend commercial applications.

The new polymers of the invention having the necessary solubility in solvents can be utilized in the formation of surface coating compositions and impregnating compositions or for the treatment of cloth, paper and the like.

The new compounds are also useful for the synthesis of other valuable derivatives. The esters of the 2,3-dihydroxytetrahydropyran-6-carboxylic acids are particularly useful. For example, the methyl, ethyl, propyl, isopropyl, butyl, pentyl, hexyl, and similar esters are of value as special solvents, etc. The higher fatty acid esters of the present dihydropyran methanols, such as the stearates, the oleates, the palmitates, and other esters of fatty acids containing from 10 to 18 carbon atoms, are of value as plasticizers, lubricants in molding compositions and the like. Unsaturated esters of the present novel carboxylic acids, such as the allyl, the methallyl, the crotyl, and homologous or analogous esters containing at least one olefinic bond in the molecule, are useful as polymerizable materials adapted to peroxide-catalyzed polymerization either alone or with other polymerizable compounds such as compounds containing reactive ethylenic bonds. The carboxylic acids of the present invention also find effective utility as basis for the preparation of derived amides, acid halides, and similar compounds.

The metal and other salts of the present carboxylic acids may be prepared advantageously as by suitable reaction of the free acid with a base, or by reaction leading to cation exchange converting the salt of one metal to the salt of another. The alkali metal salts such as sodium, potassium, lithium, etc., the ammonium salt, the alkaline earth metal salts as cesium, magnesium, calcium, and rubidium, and other metal salts such as the lead, copper, mercury, silver, barium, cadmium, chromium, cobalt, iron, nickel, aluminum, manganese, and similar salts thus are provided. The copper and similar salts of toxic metals are of particular value as components of insecticidal and fungicidal compositions, etc. The cobalt, manganese, and similar salts are of value as driers in paint compositions, and the like.

Hydrogenation of the new 2,3-dihydroxy-6-carbonyl-substituted tetrahydropyrans to obtain polyols which have many applications is a special feature of the invention. A typical method of hydrogenation is illustrated in the following example:

*Example X.—1,2,5,6-hexanetetrol production*

2,3 - dihydroxytetrahydropyran-6-methanol was prepared as in Example VII and the aqueous hydroxylation mixture was transferred to an autoclave without isolating the product. One teaspoonful of Raney nickel hydrogenation catalyst was added and the mixture was hydrogenated at 60° C. and 750 pounds hydrogen pressure. After 3 hours, the temperature was raised to 80° C. for another 2 hours. Absorption of hydrogen was finally very slow at the point where 85% of the theoretical amount had been consumed. The autoclave was cooled, vented, and the catalyst (pyrophoric) removed by filtration. After concentration to a residue, the latter (39 g.) was recrystallized from ethanol-ethyl acetate at −20° C. to give 17 g. (45% yield) of crude 1,2,5,6-hexanetetrol, M.P. 60–65° C. Recrystallization from ethanol-acetone gave 7 g., M.P. 90–93° C. Recrystallization of this from 50 ml. of ethanol-acetone (1:1) gave 5.1 g., M.P. 94–95° C. A final crystallization was carried out at room temperature to give 4.2 g. of pure 1,2,5,6-hexanetetrol, M.P. 96–96.5° C.

The same tetrol of 90% purity (by titration of vicinal hydroxyls) was obtained by hydrogenating in the same way 2,3 - dihydroxytetrahydropyran-6-carboxaldehyde produced as in Example I. This tetrol analyzed as follows:

|  | Found | Theory ($C_6H_{14}O_4$) |
|---|---|---|
| α-Glycol value, moles/100 g | 1.19 | 1.33 |
| Hydroxyl value, eg./100 g | 2.44 | 2.66 |

In large scale production of 1,2,5,6-hexanetetrol a 22-liter glass flask was equipped with a stirrer, thermometer, two dropping funnels an pH measuring electrodes. The flask was charged with 10 liters of distilled water, 66 grams of tungstic acid and 2060 grams (18.2 moles) of 30% aqueous hydrogen peroxide. The mixture was stirred and the addition of 1860 grams (16.6 moles) of freshly distilled 3,4-dihydro-1,2-pyran-2-carboxaldehyde was started. Simultaneously, a slow stream of 1 N NaOH was added to the reactants and this rate adjusted so as to maintain a pH of 4.5–5.0. The addition was completed in 3 hours and required ice cooling in order to keep the reaction temperature at 25–30° C.

The product from two such runs was hydrogenated using Raney nickel catalyst as 60° C. and 750 p.s.i.g. hydrogen pressure, after which the hydrogenated crude was concentrated to a solid residue at 70° C. and 20 mm. Hg absolute. Recrystallization of the residue from ethanol-ethyl acetate at −20° C. gave 1830 grams of crude 1,2,5,6-hexanetetrol, M.P. 83–106° C. The yield based on 3,4-dihydro-1,2-pyran-2-carboxaldehyde charged was 37% m.

When 2,3-dihydroxytetrahydropyran-6-carboxylic acid from the method of Example IV is hydrogenated under the same conditions the product is 2,5,6-trihydroxyhexanoic acid.

Instead of Raney nickel, other hydrogenation catalysts can be used in carrying out this simultaneous ring opening and hydrogenation to obtain the tetrol products. Generally speaking, metal hydrogenation catalysts such as platinum, palladium, ruthenium, tungsten, vanadium, iron, cobalt, nickel, chromia, molybdenum and the like or mixtures thereof or their oxides or sulfides etc. can be used. Copper chromite is one example of a suitable compound hydrogenation catalyst. The catalyst may be employed in finely divided form and dispersed in the reaction mixture or it can be used in a more massive state either with or without a support such as pumice, diatomaceous earth, clay, alumina, carbon, or the like and the reactants contacted therewith by flowing the liquid mixture through a bed of the catalyst or other known hydrogenation methods can be used.

The temperature which will be most advantageous will vary with the activity of the chosen catalyst but will usually be in the range of about 30° to about 250° C., but in any case below the pyrolysis temperature of the feed and as a rule, preferably below about 150° C. Hydrogen pressures greater than atmospheric are advantageous and a convenient range of pressure is about 250 to about 10,000 pounds per square inch. Under these conditions the reaction can usually be completed in about one half to about 20 hours when using 0.05% or more of catalyst based on the weight of reaction mixture.

The polyols produced in the foregoing way can be reacted with alpha-beta-monoethylenic aldehydes having a terminal methylene group, such as acrolein or methacrolein, etc., to produce 2-vinyl dioxolane compounds which are particularly valuable in the formulation of air-drying surface coating compositions. The bis-acrolein acetal of 1,2,5,6-hexanetetrol is directly useful in this way. The acrolein acetal of 2,5,6-trihydroxyhexanoic acid or its esters are preferably used for this purpose in combination with a compound having a plurality of 2-vinyl-1,3-cyclic acetal radicals in the molecule or is reacted with itself or more preferably with a diol such as ethylene glycol or di- or tri-ethyleneglycol under esterification conditions so as to join together two molecules. The linking is preferably carried out as a transesterification according to the illustrative equations:

methyltetrahydropyran-6-carboxaldehyde of Example III: 2-vinyl-5,7a-dimethyl-5-formyl-1,3 - dioxolo[4,5-6]tetrahydropyran;

The acrolein cyclic acetal of the 2,3-dihydroxytetrahydropyran-6-carboxylic acid of Example IV: 2-vinyl-1,3-dioxolo[4,5-6]tetrahydropyran-5-carboxylic acid;

The methacrolein cyclic acetal of the n-butyl ester of the acid of Example IV: butyl 2-isopropenyl-1,3-dioxolo-[4,5-6]tetrahydropyran-5-carboxylate;

The acrolein cyclic acetal of 2,3-dihydroxy-6-methyltetrahydropyran-6-carboxylic acid of Example V: 2-vinyl-5-methyl-1,3-dioxolo[4,5-6]tetrahydropyran-5 - carboxylic acid;

The methacrolein cyclic acetal of the 2-ethylhexylester of 2,3-dihydroxy-3,6-dimethyltetrahydropyran-6-carboxylic acid of Example VI: 2-ethylhexyl-2-isopropenyl-5,7a-dimethyl-1,3-dioxide[4,5-6]tetrahydropyran - 5 - carboxylate;

The acrolein cyclic acetal of 2,3-dihydroxy-6-methyldropyran-6-methanol of Example VII: 2-vinyl-1,3-dioxolo-[4,5-6]tetrahydropyran-5-methanol;

The methacrolein cyclic acetal of the 2,3-dihydroxy-6-methyltetrahydropyran-6-methanol of Example VIII: 2-

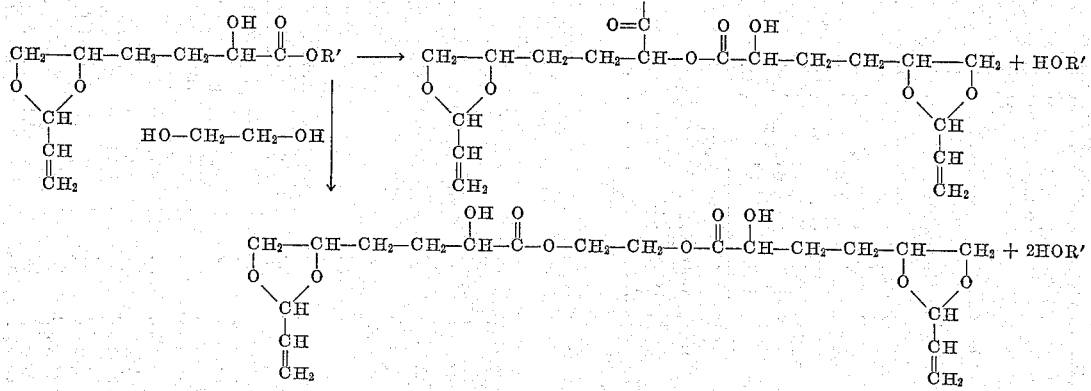

Here R' is the radical of a lower alkanol. Alkyl orthotitanates are advantageous catalysts for carrying out the ester exchange without opening the acetal rings.

Another special feature of the invention is the cyclic acetal derivatives of the hereinbefore-described new 2,3-dihydroxytetrahydropyran aldehydes, carboxylic acids and esters, and methylol compounds. The acetal group of these new products is derived from alpha,beta-monoethylenic aldehydes having a terminal methylene group such as acrolein methacrolein, alpha-ethylacrolein and the like. One important type of these new compounds has the general structural formula:

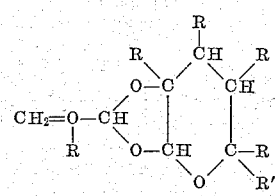

in which each R represents a hydrogen atom or a lower alkyl group as previously defined and R' represents a formyl, carboxyl, ester or methylol group. Typical examples of compounds of this type are:

The acrolein cyclic acetal of the 2,3-dihydroxytetrahydropyran-6-carboxaldehyde of Example I: 2-vinyl-5-formyl-1,3-dioxolo[4,5-6]tetrahydropyran;

The methacrolein cyclic acetal of the 2,3-dihydroxy-6-methyltetrahydropyran-6-carboxaldehyde of Example II: 2 - isopropenyl-5-methyl-5-formyl-1,3-dioxolo[4,5-6]tetrahydropyran;

The acrolein cyclic acetal of the 2,3-dihydroxy-3,6-dimethyltetrahydropyran-6-carboxaldehyde of Example III:

vinyl-5-methyl-1,3-dioxolo[4,5-6]tetrahydropyran-5-methanol, and

The alpha-ethyl acrolein cyclic acetal of the 2,3-dihydroxy-3,6-methyltetrahydropyran-6-methanol of Example IX: 2-isopropenyl-5,7a-dimethyl-1,3 - dioxolo[4,5-6]tetrahydropyran-5-methanol.

These and the related cyclic acetals of 2,3-dihydroxytetrahydropyrans of the foregoing general formula can be used advantageously with the previously described compounds having a plurality of 2-vinyl-1,3-cyclic acetal radicals per molecule in making air-drying surface coating compositions. Mixtures of these cyclic acetals of 2,3-dihydroxytetrahydropyran compounds with the bis-acrolein and/or bismethacrolein acetal of 1,2,5,6-hexanetetraol are especially useful for this purpose.

In making air-drying surface-coating compositions of this general type one can also use as the component or components having a plurality of 2-vinyl-1,3-cyclic acetal radicals in the molecule, the products obtainable by linking together a plurality of molecules of the foregoing cyclic acetals of the 2,3-dihydroxy-tetrahydropyran compounds or by linking together a plurality of the new 2,3-dihydroxytetrahydropyran compounds and reacting the product with an alpha,beta-monoethylenic aldehyde having a terminal methylene group to introduce the required plurality of 2-vinyl-1,3-cyclic acetal radicals. Thus, for example, the 2,3-dihydroxytetrahydropyran-6-carboxaldehydes of Examples I, II, and III, individually or as mixtures of two or all three of these aldehydes, can be subjected to Tishchenko reaction in the presence of an aluminum alkoxide. For instance, about 0.1 to about 5 mole percent of aluminum triisopropoxide based on the amount of aldehyde present can be used at about 10° to about 50° C. employing isopropanol as solvent. The product ester can then be converted to the bis-cyclic acetal under the acetal-forming conditions previously described, the reaction taking place according to the equation:

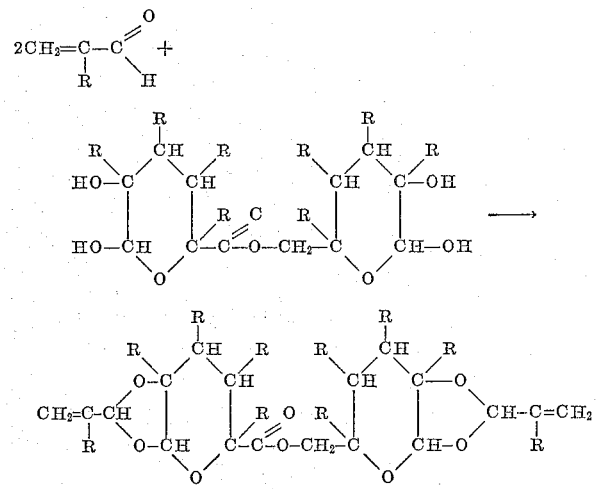

The same compounds can be obtained by similar Tishchenko reaction of the cyclic acetals of the 2,3-dihydroxytetrahydropyran-6-carboxaldehydes or by esterification of the cyclic acetals of the 2,3-dihydroxytetrahydropyran-6-carboxylic acids of Examples IV, V and VI or like acids with the cyclic acetals of 2,3-dihydroxytetrahydropyran-6-methanols such as those of Examples VII, VIII, and IX. Instead of the carboxylic acids one can use their esters of lower aliphatic monohydric alcohols as starting materials and conduct the reaction as an alcohol exchange in which the lower alcohol is removed from the mixture as fast as it is formed. In these ways one can obtain:

2-vinyl-1,3-dioxolo[4,5-b]-5-tetrahydropyranylmethyl-2-vinyl-1,3-dioxolo[4,5-b]tetrahydropyran-5-carboxylate 2-vinyl-1,3-dioxolo[4,5-b]-5-methyl-5-tetrahydropyranylmethyl-2-vinyl-1,3-dioxolo[4,5-b]-5-methyltetrahydropyran-5-carboxylate 2-isopropenyl-1,3-dioxolo[4,5-b]-5,7a-dimethyl-5-tetrahydropyranylmethyl - 2 - isopropenyl-1,3-dioxolo[4,5-b]-5,7a-dimethyltetrahydropyran-5-carboxylate 2-isopropenyl-1,3-dioxolo[4,5-b]-5,7a-dimethyl-5-tetrahydropyranylmethyl-2-vinyl-1,3-dioxolo[4,5-b]tetrahydropyran-5-carboxylate 2-isopropenyl-1,3-dioxolo[4,5-b]-6,7-dimethyl-5-tetrahydromethyl-2-vinyl-1,3-dioxolo-6,7-dimethyltetrahydropyran-5-carboxylate Instead of direct linking of the new 2,3-dihydroxytetrahydropyran compounds in the foregoing ways, these compounds or the previously described cyclic acetals can be linked by means of a polyfunctional compound reactive with the formyl, carboxylic acid, carboxylic acid ester or methanol group which they contain. For instance, the 2,3 - dihydroxytetrahydropyran - 6 - carboxaldehydes can be reacted with a dialdehyde such as glutaraldehyde under aldol condensation conditions. The 2,3-dihydroxytetrahydropyran-6-carboxylic acids or their esters can, for example, be reacted with a polyol such as ethylene glycol, glycerol or 1,2,6-hexanetriol or the like to obtain polyesters, and the 2,3-dihydroxytetrahydropyran-6-methanols can be esterified with polycarboxylic acids such as oxalic, maleic, malonic, tartaric, phthalic and like acids to link together a plurality of molecules through the methylol group. Due to the tendency of the ring hydroxyl groups to undergo esterification at the same time, it is usually advantageous to convert the 2,3-dihydroxytetrahydropyran-6-carboxylic acid or ester or methanol to its cyclic acetal before carrying out the esterification reaction which should be conducted under carefully controlled conditions at which opening of the cyclic acetal rings is avoided. One suitable method is ester exchange between the starting 2,3-dihydroxytetrahydropyran-6-carboxylic acid or ester and an ester of the polyol to be used as linking agent, for instance ethyleneglycol diacetate, or between the 2,3-dihydroxytetrahydropyran - 6 - methanol and a polyester of the linking polycarboxylic acid, for example diethyl fumarate or dimethyl phthalate or the like. Catalysts for the ester exchange are alkali metal alkoxides such for instance as sodium methoxide or tetraalkyl titanates of which tetraisopropyl and tetrabutyl titanates are typical examples. The reaction is preferably conducted under anhydrous conditions with continuous removal of the liberated lower boiling carboxylic acid or alcohol. Distillation with an agent which forms a lower boiling azeotrope with the liberated acid or alcohol is one advantageous method of carrying out the ester exchange. Thus, one can reflux with toluene or the like and take off toluene-methanol binary azeotrope when carrying out the exchange with dimethylphthalate or the toluene-acetic acid binary when exchanging with ethylene glycol diacetate. The reaction can usually be completed in about one to five hours. Examples of the esters obtainable in good yields in this way are:

(1) Bis(2-vinyl-1,3-dioxolo[4,5-b]-5-tetrahydropyranylmethyl)terephthalate.
(2) Bis-(2-isopropenyl-5-methyl-1,3-dioxolo[4,5-b]-5-tetrahydropyranylmethyl)maleate.
(3) Ethylenebis-(2-vinyl-1,3-dioxolo[4,5-b]tetrahydropyran-5-carboxylate).
(4) 1,4-but-2-enylenebis(2-vinyl-1,3-dioxolo[4,5-b]tetrahydropyran-5-carboxylate).

With these and similar polyesters taken individually or as mixtures, either alone or preferably with one or more compounds having a single 2-vinyl-1,3-cyclic acetal in the molecule, most advantageously one or more of the previously described new acetals of 2,3-dihydroxytetrahydropyran-6-carboxaldehydes, or -6-carboxylic acids, or -6-carboxylic acid esters or -6-methanols, surface coating compositions can be prepared. Air-drying compositions are obtained by incorporating in the mixture a metallic drier compound of the kind widely used to impart air-drying properties to drying oil-containing paints, varnishes and enamels. Suitable compounds of cobalt, lead, manganese, copper and like metals are advantageous, particularly as soluble soaps, salts and the like, especially the oleates, nephthenates, resinates, etc. The amount of drier compound which will be most suitable will vary with the kind of metal and the particular mono- and polyacetal derivatives of the starting 2,3-dihydroxytetrahydropyran compound or compounds chosen, the air temperature employed and the drying speed desired. Generally amounts of metal in the drier of the order of about 0.0005% to about 3% based on the weight of organic film-forming material in the composition are suitable. The proportion of mono- to poly-cyclic acetal compound or compounds in the mixture will ordinarily be about 10 to about 60% of mono- to about 90 to about 40% w. of poly-.

These new air-drying film-forming compositions can be used with or without volatile organic solvents such as petroleum fractions, benzene, acetone, amyl alcohol and the like and their mixtures. Where the liquid mixtures have viscosities which make them suitable for application by spraying or brushing, they are preferably used without added solvent, however. They can be applied as clear coatings or can be mixed with pigments or any of the other ingredients usually used in surface-coating compositions including any other suitable film forming resins or oils, etc.

I claim as my invention:

1. A polyhydroxycyclic ether-substituted aldehyde of the formula

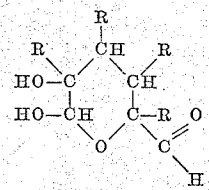

wherein each R represents a member of the group consisting of hydrogen and lower alkyl.

2. A polyhydroxycyclic ether-substituted formic acid of the formula

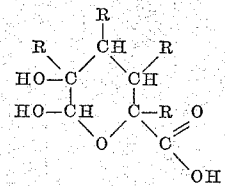

wherein each R represents a member of the group consisting of hydrogen and lower alkyl.

3. A polyhydroxycyclic ether-substituted formate of the formula

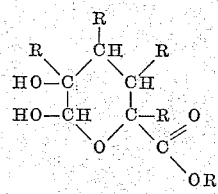

wherein each R represents a member of the group consisting of hydrogen and lower alkyl and R' is a member of the group consisting of aliphatic saturated hydrocarbon of 1 to 18 carbon atoms and aliphatic mono-olefinic hydrocarbon of 1 to 18 carbon atoms.

4. A polyhydroxycyclic ether-substituted methanol of the formula

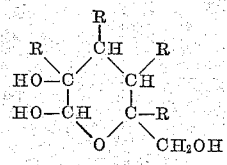

wherein each R represents a member of the group consisting of hydrogen and lower alkyl.

5. 2,3-dihydroxytetrahydropyran-6-carboxaldehyde.
6. 2,3-dihydroxytetrahydropyran-6-carboxylic acid.
7. Lower alkyl ester of 2,3-dihydroxytetrahydropyran-6-carboxylic acid.
8. 2,3-dihydroxytetrahydropyran-6-methanol.
9. A process for producing a tetra-hydroxy substituted alkane which comprises hydroxylating 3,4-dihydro-1,2-pyran-2-carboxaldehyde having attached to the ring only said formyl group and members of the group consisting of hydrogen and lower alkyl groups by reaction with hydrogen peroxide and hydrogenating the hydroxylation product by reaction with hydrogen at about 30° to about 250° C. in the presence of a hydrogenation catalyst.
10. A process in accordance with claim 9 in which the hydroxylation is effected by reaction with $H_2O_2$ at about 10° to about 60° C. in the presence of tungstic acid catalyst while maintaining the pH about 4 to about 6 and the hydrogenation is conducted at about 50° to about 100° C. using Raney nickel as catalyst and a hydrogen pressure of about 250 to 1000 p.s.i.g. using the catalyst-containing aqueous hydroxylation mixture without isolating the hydroxylation product.
11. A method for producing 1,2,5,6-hexanetetrol which comprises hydroxylating 3,4-dihydro-1,2 - pyran - 2 - carboxaldehyde by reaction with $H_2O_2$ in the presence of tungstic acid catalyst and hydrogenating the hydroxylation product by reaction with hydrogen at about 30° to about 250° C. in the presence of a hydrogenation catalyst.
12. A process for producing a tetra-hydroxy alkane having a pair of directly connected carbinol groups linked by a dimethylene chain to another pair of directly connected carbinol groups by reaction with hydrogen peroxide which comprises hydroxylating 3,4-dihydro-1,2-pyran-2-methanol having attached to the ring only said methanol group and lower alkyl groups and hydrogenating the hydroxylation product by reaction with hydrogen at about 30° to about 250° C. in the presence of a hydrogenation catalyst.
13. A method for producing 1,2,5,6-hexanetetrol which comprises hydroxylating 3,4-dihydro-1,2-pyran-2-methanol by reaction with $H_2O_2$ in the presence of tungstic acid catalyst and hydrogenating the aqueous tungstic catalyst-containing hydroxylation product in the liquid phase by reaction with hydrogen in the presence of a metal hydrogenation catalyst.
14. A process for producing a tetra-hydroxy alkane which comprises hydrogenating at about 30° to about 250° C. and about 250 to about 10,000 p.s.i. hydrogen in the presence of a metal catalyst for the hydrogenation, the aqueous catalyst-containing solution of 2,3-dihydroxy-tetrahydropyran-6-methylol having attached to the ring only said methylol and members of the group consisting of hydrogen and lower alkyl obtained by hydroxylating the corresponding 3,4-dihydro-1,2-pyran-2-methylol at about 10° to about 60° C. using tungstic acid catalyst.
15. A process for producing tetra-hydroxy susbtituted alklane which comprises hydrogenating an aqueous solution of 2,3-dihydroxytetrahydropyran - 6 - carboxaldehyde at about 30° to below about 150° C. using a hydrogen pressure of about 250 to about 10,000 p.s.i. and a finely divided metal hydrogenation catalyst.

References Cited in the file of this patent

UNITED STATES PATENTS

| | | |
|---|---|---|
| 2,479,283 | Whetstone | Aug. 16, 1949 |
| 2,514,172 | Whetstone et al. | July 4, 1950 |
| 2,562,848 | Whetstone | July 31, 1951 |
| 2,658,081 | Emerson et al. | Nov. 3, 1953 |
| 2,694,077 | Guest et al. | Nov. 9, 1954 |
| 2,831,000 | Buckley et al. | Apr. 15, 1958 |

FOREIGN PATENTS

| | | |
|---|---|---|
| 72,875 | Netherlands | July 15, 1953 |

OTHER REFERENCES

Petersen: Journal Am. Pharm. Assoc. Sci. Ed., vol. 49, pp. 750–755 (1960).

Francis et al.: Canadian Journal of Chemistry, vol. 37, pp. 972–978 (1959).

IRVING MARCUS, *Primary Examiner.*

NICHOLAS S. RIZZO, *Examiner.*